July 17, 1956  E. F. OETINGER  2,754,775

PIE TRIMMER AND CRIMPING DEVICE

Filed June 4, 1954

INVENTOR.
ELMER F. OETINGER
BY
Beau, Brooks, Buckley & Beau.
ATTORNEYS.

United States Patent Office 2,754,775
Patented July 17, 1956

2,754,775
PIE TRIMMER AND CRIMPING DEVICE
Elmer F. Oetinger, Buffalo, N. Y.
Application June 4, 1954, Serial No. 434,542
7 Claims. (Cl. 107—49)

This invention relates generally to pie-making appliances but more particularly to a device for trimming and crimping the pie prior to placing it in the oven for baking.

It has for one of its objects to provide a pie-making appliance of this character which is so designed and constructed as to facilitate both the trimming and crimping of the marginal edge of the pie in a neat and uniform fashion and in one operation and with a minimum of effort.

Another object of the invention is to provide a pie trimming and crimping device which is simple, compact and inexpensive in construction, which is easy to use, and which can be readily dismembered for cleaning when desired.

Other features of the invention reside in the construction and arrangement of parts hereinafter described and particularly pointed out in the appended claims.

Figure 1:
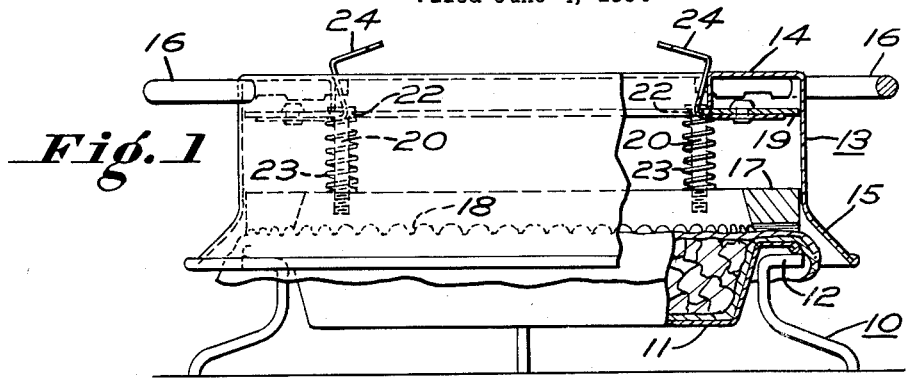
Figure 2:
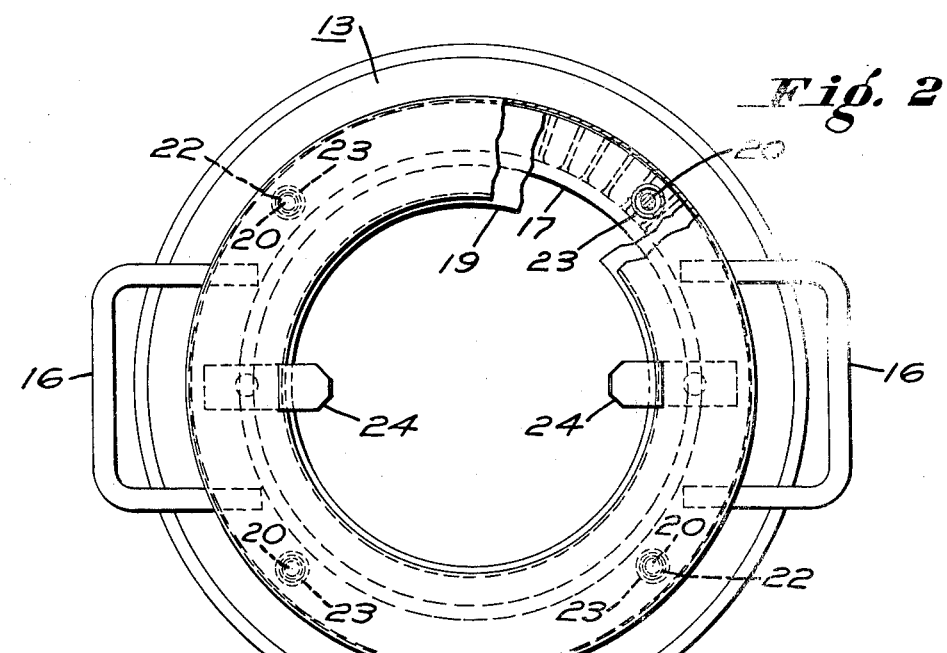
Figure 3:
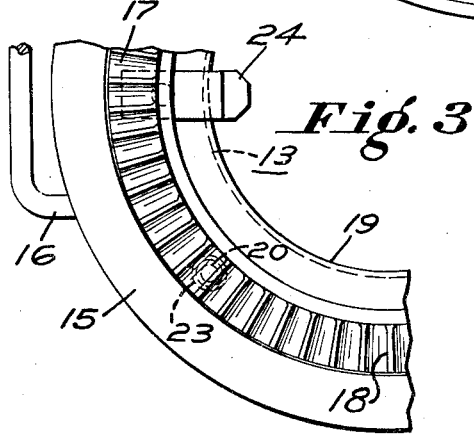
Figure 4:
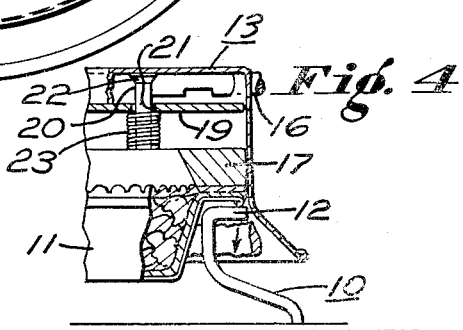

In the accompanying drawings:

Figure 1 is a sectional elevation of my improved pie-trimming and crimping device in its normal position preparatory to crimping the crust of a pie included therein.
Figure 2 is a top plan view thereof, partly in section.
Figure 3 is a fragmentary bottom plan view of the device.
Figure 4 is a sectional elevation showing the device of Fig. 1 in another position of adjustment after trimming the pie to complete crimping of the crust thereof.

Similar characters of reference indicate corresponding parts throughout the several views.

Referring now to the drawings, 10 indicates an annular or ring-like base constituting a support on which the filled pie tin 11 is placed and properly centered ready for trimming and crimping the dough which overlies the customary rim or flange of the pie tin. In this connection the annular tin-supporting rim 12 of the base preferably extends slightly beyond that of the peripheral edge of the pie tin.

My appliance is designed to be brought into encircling or nesting-like fashion over the prepared, base-supported pie and by a depressing action effect the dual act of trimming the edge of the pie and impressing a crimped or corrugated design on the top face of the rim of the pie. To this end, I provide a ring-like holder 13 of substantially inverted L-shape in cross section to provide an annular top wall 14 terminating at its outer edge in a depending outwardly-flaring side wall 15 whose inner face is adapted to encircle the edge of the pie tin as well as the base-rim 12 and serves to sever or trim the projecting dough therefrom. Handles 16 are applied to the diametrically opposite sides of this holder to facilitate its handling. Removably suspended within and from the top wall of the holder for axial displacement relative thereto is a ring-shaped crimping die 17 whose bottom face is corrugated, as indicated at 18, or of other desirable shape or contour, to make a corresponding impression on the surrounding rim-face of the pie preparatory to trimming thereof. Surmounting this crimping die and constituting a support or carrier therefor is a rang or annular member 19 and secured to and rising from the die are a plurality of radially-spaced pins 20 extending through companion openings 21 in the ring and terminating at their upper ends in heads 22 which normally abut on their undersides against the top face of such ring and limit the downward displacement of the die relative thereto to permit completion of the crimping operation. Coil springs 23 applied to these pins and bearing at their opposite ends against the die and its supporting ring yieldingly permit the relative axial displacement of the former relative to the latter during the act of depressing the appliance over the pie to perform the trimming and crimping operations. Spring clasps 24 are secured to diametrically opposite sides of the die-supporting ring for detachable yieldable engagement with the companion inner marginal portion of the ring-like holder 13 to normally retain such ring in operative coupled relation thereto and yet permit its ready removal for cleaning the die and associated parts when desired.

I claim as my invention:

1. A device of the character described, comprising a base for supporting a pie tin, and means adapted to be brought into an operative relation to the supported pie tin for trimming and crimping the pie including a ring-like holder having a lower annular flaring side wall portion for encircling engagement with the pie to trim the edge therefrom, an annular-shaped crimping die and means for suspending said die within said holder for axial displacement relative thereto from a normal position between the upper and lower edges of said side wall portion for operative engagement with the rim-face of the pie to crimp the same said suspending means including spring mounting means urging said die toward the flared end of said ring for resiliently maintaining said die in said normal position within said limits of said side wall, whereby the pe can be crimped prior to trimming thereof.

2. A pie trimming and crimping device, comprising a ring-like holder defining a top wall and a depending outer side wall, the inner face of the latter constituting a trimming face, a ring-shaped crimping die, and means for suspending said die within said holder for axial displacement relative thereto from a normal position extended below the trimming face to a position overlapped thereby, said suspending means including spring mounting means urging said die below said trimming face for resiliently maintaining said die in said normal position, whereby the pie can be crimped prior to trimming thereof.

3. A pie trimming and crimping device, comprising a ring-like holder defining a top wall and a depending outer side wall, the inner face of the latter constituting a trimming face, a ring-shaped support detachably fitted within said holder adjacent its top wall, a ring-shaped crimping die, and means for suspending said die from said support for limited axial displacement relative thereto, said suspending means including spring mounting means resiliently urging said die to a normal position below said trimming face, whereby the pie can be crimped prior to trimming thereof.

4. A pie trimming and crimping device, comprising a ring-like holder defining a top wall and a depending outer side wall, the inner face of the latter constituting a trimming face, a ring-shaped support detachably fitted within said holder adjacent its top wall, a ring-shaped crimping die, and means for suspending said die from said support for limited axial displaced relative thereto said suspending means including coil springs interposed between said support and said die for urging said die to a normal position below said trimming face, whereby the pie can be crimped prior to trimming thereof.

5. A pie trimming and crimping device, comprising a ring-like holder of substantially inverted L-shape in cross section to define an inwardly-facing annular top wall and an annular outwardly-flaring side wall depending from the periphery of such top wall, handles applied to the diametrically-opposite sides of said holder, a ring-shaped support nested within the holder adjacent its upper end and having clasps thereon for detachable engagement with the inner periphery of the top wall of such holder, a ring-shaped crimping die disposed in spaced suspended relation to said support for axial displacement relative thereto and having headed pins rising therefrom in sliding engagement with said support, and coil springs applied to said pins and interposed between the opposing faces of said crimping die and said support.

6. A pie trimming and crimping device comprising an annular support member, a ring-like holder having such annular support member fitted therein, the upper end of said holder extending inwardly into an upper wall formation and then downwardly to provide abutment shoulders inwardly of said holder, a plurality of spring clips for detachably holding said support member against said abutment shoulders, a plurality of headed retaining pins loosely journaled at spaced positions in said support member radially outwardly relative to said housing abutment shoulders, an annular crimping die connected to the lower end of said retaining pins and being arranged for limited axial displacement relative to said holder as determined by the clearance between the underside of said upper wall formation and the upper face of said annular support member, and resilient means normally pressing said crimping die away from said support member.

7. In a pie trimming and crimping device, in combination, an annular crimping member, an annular support member, connection means between said crimping and support members arranged to permit restricted movement of the one away from the other, resilient means urging said crimping and support members apart, a holder containing the above elements therein, and spring clip means detachably interconnecting said support member and one end of said holder, the opposite end of said holder being formed with an outwardly flaring wall portion from a point thereof near the crimping surface of said crimping member when maintained under the influence of said resilient means in its normal position relative to said support member.

References Cited in the file of this patent

UNITED STATES PATENTS

| | | |
|---|---|---|
| 808,015 | Coppins | Dec. 19, 1905 |
| 1,113,616 | Grim | Oct. 13, 1914 |
| 2,106,057 | Napolillo | Jan. 18, 1938 |
| 2,409,021 | Dale | Oct. 8, 1946 |